United States Patent
Gharachorloo et al.

(10) Patent No.: US 7,174,346 B1
(45) Date of Patent: Feb. 6, 2007

(54) SYSTEM AND METHOD FOR SEARCHING AN EXTENDED DATABASE

(75) Inventors: Kourosh Gharachorloo, Menlo Park, CA (US); Fay Wen Chang, Mountain View, CA (US); Deborah Anne Wallach, Emerald Hills, CA (US); Sanjay Ghemawat, Mountain View, CA (US); Jeffrey Dean, Menlo park, CA (US)

(73) Assignee: Google, Inc., Mountian View, CA (US)

( * ) Notice: Subject to any disclaimer, the term of this patent is extended or adjusted under 35 U.S.C. 154(b) by 473 days.

(21) Appl. No.: 10/676,650

(22) Filed: Sep. 30, 2003

Related U.S. Application Data

(60) Provisional application No. 60/491,507, filed on Jul. 31, 2003.

(51) Int. Cl.
*G06F 17/30* (2006.01)

(52) U.S. Cl. ............... 707/102; 707/100; 707/101; 707/103 R; 707/104.1

(58) Field of Classification Search .............. 707/2, 707/3, 4, 5, 10, 100, 101, 102, 103 R, 104.1; 715/532; 717/108; 704/10
See application file for complete search history.

(56) References Cited

U.S. PATENT DOCUMENTS

| | | | | |
|---|---|---|---|---|
| 4,633,391 A | * | 12/1986 | Rundell ................ | 707/7 |
| 5,299,123 A | * | 3/1994 | Wang et al. ............ | 707/2 |
| 5,715,446 A | * | 2/1998 | Kinoshita et al. ......... | 707/5 |
| 5,761,688 A | * | 6/1998 | Morishita ............. | 715/532 |
| 5,878,260 A | * | 3/1999 | Copeland et al. ......... | 717/108 |
| 6,169,999 B1 | * | 1/2001 | Kanno ................. | 715/532 |
| 6,658,533 B1 | | 12/2003 | Bogin et al. ............ | 711/135 |
| 6,778,977 B1 | * | 8/2004 | Avadhanam et al. ...... | 707/2 |
| 2003/0212662 A1 | * | 11/2003 | Shin et al. ............. | 707/2 |
| 2004/0059718 A1 | * | 3/2004 | Zhou et al. ............. | 707/3 |
| 2004/0199530 A1 | * | 10/2004 | Avadhanam et al. ...... | 707/100 |
| 2005/0273318 A1 | * | 12/2005 | Zhou et al. ............. | 704/10 |

OTHER PUBLICATIONS

Sullivan, D., "Inktomi Reenters Battle For Biggest", searchenginewatch.com, Jun. 2, 2002.

* cited by examiner

*Primary Examiner*—Frantz Coby
(74) *Attorney, Agent, or Firm*—Morgan, Lewis & Bockius LLP

(57) ABSTRACT

Once a search query is received from a user, a standard index is searched based on the search query. The standard index forms part of a set of replicated standard indexes having multiple instances of the standard index. A signal is then determined based on the search of the standard index. When the received signal meets predefined criteria, an extended index is searched. The extended index forms part of a set of extended indexes having at least one instance of the extended index. There are fewer instances of the extended index than instances of the standard index. Extended search results are then obtained from the extended index and at least a portion of the extended search results is transmitted towards a user.

33 Claims, 9 Drawing Sheets

SYSTEM AND METHOD FOR SEARCHING AN EXTENDED DATABASE

This application claims priority to U.S. Provisional Application 60/491,507, filed Jul. 31, 2003, which is hereby incorporated by reference.

FIELD OF THE INVENTION

The present invention relates to the field of search engines. In particular, the present invention relates to a system and method for providing improved search results by searching an extended index server.

DESCRIPTION OF RELATED ART

Most people searching the World Wide Web (WWW) use a search engine. These search engines are designed to help locate information stored on Web sites. Most, if not all, search engines search the WWW for one or more terms, keep an index of the terms they find and where they find them, and allow users to look for terms found in the index. A term is any word or group of words, such as a phrase or a combination of one or more words or phrases, that is treated as a unit when searching for documents containing the term.

To index the billions of Web pages that exist on the WWW, a search engine's "web crawler" locates and downloads Web pages (sometimes herein called documents). Indexing modules or engines in the search engine process the downloaded documents, creating an index of terms found in those documents. In some embodiments, the indexing modules may ignore insignificant terms, may create index entries for predefined terms, and may include in the index information about where in the document each indexed term is located.

The index created by the search engine can be used to identify documents that contain one or more terms, often called a search query. To search for documents on a particular subject, a user enters or otherwise specifies a search query, which includes one or more terms, and submits the search query to the search engine. The search engine then searches its index to identify documents that contain the terms specified by the search query. If the index contains a very large number of documents that satisfy the search query, for example, more than ten thousand documents (or any other suitable threshold), the search engine may utilize various mechanisms to truncate the search or to otherwise limit the number of document identifiers returned by the index search. In any case, each document located by the search engine in response to the search query (excluding those documents which satisfy the query but are not included in the search results) is given a score, otherwise known as the "query score" based on the occurrence of the search terms within the document as well as the document's page rank. A search result listing the located documents ordered by query score is then presented to the user. In other words, the documents with the best (e.g., highest) query scores are presented first in the search result listing, followed by documents having a lower query score. In addition, it should be understood that the search result listing generally includes a listing of documents that satisfy the search query, not the documents themselves. The search query listing will typically include for each listed document a title or other identifying information extracted from the document, a link (sometimes called a hyperlink or anchor tag) to the document, and a "snippet" of text from the document to help the user decide whether to view the document.

It is noted that many search engines only index a portion of the WWW. Typically, the indexed portion is very large and satisfies most search queries. However, some search queries will locate few or no documents when searching indexes that cover most, but not all, of the WWW. Accordingly, it would be desirable to provide a system and method that searches the remainder of the WWW where few or no results are obtained when searching the standard indexes.

SUMMARY

A document search system includes a plurality of standard search engines, each having a local instance of a standard index of documents and an extended index of documents. Each of the standard search engines includes search logic configured to search the standard index of documents based on a respective search query, and to receive a signal based on the searching of the standard index. Each index server also includes extended logic, activated when the received signal meets predefined criteria, and configured to search the extended index based on the respective search query to obtain extended search results from the extended index. Each index server additionally includes an interface to transmit at least a portion of the extended search result.

In an extended search method, search queries are received at each of a plurality of standard search engines. Each search engine has a local instance of a standard index of documents. At each of the standard search engines, the standard index of documents is searched based on a respective received search query. A signal is subsequently received based on the searching of the standard index. For example, the signal can include an indication whether only a few search results were obtained from searching the standard index. When the received signal meets predefined criteria, a shared extended index is searched based on the respective received search query to obtain extended search results. At least a portion of the extended search results are transmitted to the user who submitted the search query. The shared extended index is shared by the plurality of standard search engines.

BRIEF DESCRIPTION OF THE DRAWINGS

For a better understanding of the nature and objects of the invention, reference should be made to the following detailed description, taken in conjunction with the accompanying drawings, in which.

Like reference numerals refer to corresponding parts throughout the several views of the drawings.

DETAILED DESCRIPTION OF EMBODIMENTS

Figure 1:
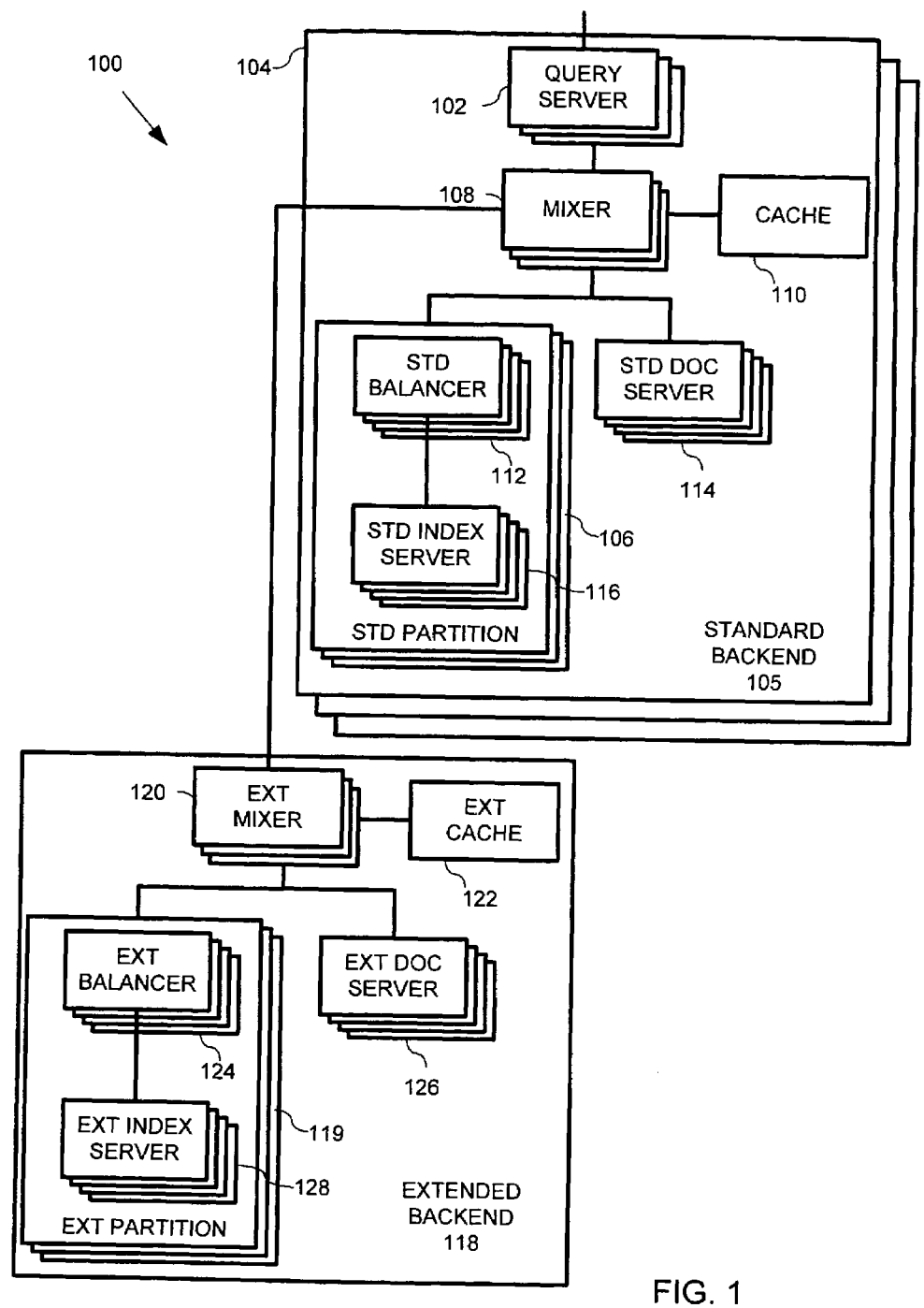
FIG. 1 illustrates an embodiment of a search engine system.

FIG. 1 illustrates an embodiment of a search engine system 100. It should be appreciated that the layout of the search engine system 100 is merely exemplary and may take on any other suitable layout or configuration. The search system 100 is used to search an index of documents, such as the billions of Web pages or other documents indexed by modern search engines.

The search engine system 100 includes multiple datacenters 104 housing a standard backend 105. The datacenters 104 are generally widely dispersed from one another, such as throughout the continental United States. Search queries submitted by users to the search engine system are routed to an appropriate datacenter 104, based on current load, geographic locality, whether that datacenter is operating, etc.

Each standard backend 105 preferably includes multiple query servers 102 that are coupled to a network (not shown). The network is preferably the Internet, but may also be any local area network (LAN), wide area network (WAN), or the like. In a preferred embodiment, each query server 102 is a Web server that receives search requests and delivers search results in the form of web pages via HTTP, XML, or similar protocols. Alternatively, if a query server 102 is used within a LAN, i.e., internally and not by the public, it may be an intranet server. In essence, the query servers 102 are configured to control the search process, including searching various index servers, analyzing and formatting the search results, etc.

Each datacenter 104 also preferably includes multiple mixers 108 coupled to the multiple query servers 102. Each of the multiple mixers is preferably coupled to a cache 110, multiple standard partitions 106, and multiple standard document servers 114. Each mixer 108 is configured to receive requests from a query server 102 and transmit the requests to the cache 110, the standard partitions 106, or the standard document servers 114. The cache 110 is used to speed up searches by temporarily storing previously located search results. In some embodiments the cache 110 includes both high speed memory and disk storage for storing cache search results. In some embodiments, the cache 110 is distributed over multiple cache servers. Furthermore, in some embodiments, the data (search results) in the cache 110 is replicated in a parallel set of cache servers. Providing more than one copy of the cache data provides both fault tolerance and improved throughput.

Search results are stored and removed from the cache 110 by any suitable storage method, such as first in first out (FIFO), last in first out (LIFO), or the like. For each cached search query, the cache preferably stores a search query identifier (e.g. a hash value generated by applying a one way hash function to a normalized form of the query); an ordered list of document identifiers for documents that satisfy the search query; and parameters of the corresponding search result. In some embodiments, each cache entry for storing a cached search result includes a valid bit for indicating whether the entry currently stores a valid search result. The cache 110 responds to the mixer with an indication of whether the search results for the specified query are contained in the cache. If so, the mixer 108 receives those search results (or an appropriate subset of the search results) for returning to the sender of the search query.

Some cache result entries also include portions of documents, such as the snippets of a subset of the documents identified by the document identifiers in the cache entry. The portions of documents are the portions to be displayed to a query requester, to help the user to determine whether to select the document for viewing. In some embodiments, the document portions are stored in a location (e.g., a memory or disk location) identified by a pointer in the cached search result entry. The document portions may be organized as a list, and may contain document portions for only a small portion of the documents identified by the document identifiers. For example, the document portions may comprise document portions for one or more "pages of results", where each page of results includes document portions for N (e.g., 15, or more generally 10 to 50) documents. However, some cached search results need not include document portions. In some embodiments document portions are not stored in the cache. Instead, the document portions are generated in response to each search query and are not stored in the cache. In some embodiments, the document portions are stored in a separate cache data structure from the index results.

If the search results for the specified search query are not stored in the cache 110, the mixer 108 sends a normalized search query to the standard partitions 106. Each standard partition 106 includes a standard balancer 112 and a set of standard index servers 116. In some embodiments, each partition includes multiple standard balancers 112, but it is easier to first explain the operation of a partition 106 having a single balancer 112, and to then explain use of multiple standard balancers 112 in each partition 106. Conceptually, the standard document index (which may be considered to be the main document index of the search engine system 100) is divided into partitions, called document index partitions, and each of the document index partitions is divided into sub-partitions. The function of each standard balancer 116 is to coordinate work by the standard index servers 116 in its partition 106. The function of each standard index server 116 is to search one or more sub-partitions of the document index for the terms in a search query and to produce a list of documents that satisfy the search query. The number of sub-partitions of the document index serviced by each standard index server 116 may vary, and is preferably between one and eight.

Each standard balancer 112 is preferably coupled to all the standard index servers 116 in its partition 106. Each standard balancer 112 is configured to forward the search query to all of the standard index servers 116 to which it is coupled; receive lists of search results from the standard index servers 116; collate the results; and forward the collated results to the mixer 108. In a preferred embodiment, there are multiple partitions 106 and multiple index servers 116 are used in each partition 106 because of the sheer volume of documents listed in the search engine's index. Since each partition stores a different portion of the overall index, all partitions are sent the search request from the mixer.

As noted above, in some embodiments each partition 106 has a plurality of standard balancers 112, each of which is coupled to all the standard index servers 116 in the partition 106. Each search query is sent by the mixer 108 to a single balancer 112 within each partition 106. Providing multiple balancers 112 within each partition 106 enables efficient processing of high volumes of search queries. In use, any of the balancers for a given partition can receive a particular search request and transmit it to the standard index servers of that partition.

In some embodiments, some or all of the sub-partitions of each partition 106 are replicated, meaning that there are two or more copies of the replicated sub-partitions. In some embodiments, the sub-partitions are organized such that a subset of the sub-partitions (for each partition 106) index the documents having the highest page ranks of the documents in that partition, and only the sub-partitions for the documents having the highest page ranks are replicated. Sub-partitions are replicated to improve throughput and to provide fault tolerance. In these embodiments, each search query is directed by the balancer to only one instance of each sub-partition.

The standard search index servers 116 are also preferably configured to truncate the search, when necessary, so as not to return more than a predefined number of documents to the standard balancer 112 or mixer 108. In some embodiments, when the number of documents found by an index server to satisfy the search query exceeds the predefined number P, the search is truncated by selecting the P qualified documents (i.e., that satisfy the search query) having the highest page rank or other static measure of relevance for a page/document. Page rank is a query independent rank assigned to documents, indicating the likely importance of the document without regard to any specific query. In other embodiments, the search by each standard index server may be truncated in other ways, or alternately the search may not be truncated at all.

Filtering the search results may occur at any level in the system 100. For example, the standard balancer 112 or the mixer 108 may be configured to remove any duplicate entries from the search results received from the various index servers 116, and to collate these lists into a single list of search results. In some embodiments, a query score is computed by the standard index servers 116 for each document identified as satisfying the search query, excluding any documents not included in the search results due to search truncation. The query score values for the documents in the search results are conveyed to the mixer 108 and/or the query server 102, and are used to construct an ordered search results list. Once the mixer 108 constructs the ordered search results list, the mixer transmits to the standard document servers 114 requests for snippets of an appropriate subset of the documents in the ordered search list. For instance, the mixer 108 may request snippets for the first fifteen or so of the documents in the ordered search results list. It should, however, be appreciated that the search results may be transmitted back to the query server 102, which in turn may transmit a request for snippets to the standard document servers 114 (potentially using a different mixer). The standard document servers 114 construct snippets based on the search query, and return the snippets to the mixer 108. The mixer then returns a list of located documents and snippets back to the query server 102 for onward transmittal to the sender of the search query. In some embodiments the mixer also stores the snippets in the cache 110 so that a subsequent execution of the same search does not require regeneration of the snippets.

Each of the standard index servers 116 preferably contains an index or database that maps terms to corresponding document identifiers. For example, a standard index server 116 may include an index or database containing a search term "IEEE" and a list of documents, identified by document identifier or URL, in which the term "IEEE" appears.

The index or database in each standard index server 116 is actually a partition or portion of the full standard document index of the standard backend 105. In some embodiments, each standard index server 116 is configured to store and search a plurality of index partitions. In some embodiments, each of the standard index servers 116 is implemented using a plurality of computers, while in another embodiment each of the standard index servers 116 is implemented using a single computer.

The standard document servers 114 store the documents themselves. Each stored document is indexed by a document identifier. The snippets included in the search results returned by the search engine are obtained from the corresponding documents in the standard document servers 114.

The mixer 108 is also coupled to an extended backend 118. The extended backend 118 is configured for searching and returning search results from an extended index of documents. In some embodiments, the large majority of the documents included in extended index are documents that are not included in the standard index. Ideally, there is no overlap between the standard index and extended index, but in some embodiments a small number of documents appear in both indexes. In some embodiments, the documents in the extended index are relatively uncommon or obscure documents compared to the documents indexed and searched by the standard backend 105. In some embodiments, the documents in the extended index, on average, have lower page rank than the documents in the standard index.

The extended backend 118 is only searched under certain conditions, as described below with reference to FIGS. 3A–D and 4. Accordingly, there are far fewer extended backends 118 than there are standard backends 105 or datacenters 104. In one embodiment, multiple datacenters, each having one or more standard backends 105, utilize a single extended backend 118. In another embodiment, multiple datacenters, each having one or more standard backends 105, utilize two extended backends 118, thereby providing redundancy. In some embodiments, the number of standard backends 105 exceeds the number of extended backends 118 by at least a factor of two, and in some embodiments the number of standard backends 105 exceeds the number of extended backends 118 by at least a factor of three.

The extended backend 118 preferably includes multiple extended mixers 120 coupled to the mixers 108. The extended mixers 120 are preferably coupled to an extended cache 122, extended partitions 119, and extended document servers 126. Each extended partition 119 includes extended balancers 124 that are coupled to one or more extended index servers 128. The extended mixer 120, extended cache 122, extended balancers 124, extended index servers 128, and extended document servers 126, are similar to the mixer 108, cache 110, standard balancers 112, standard index servers 116, and standard document servers 114, respectively, except, they are used exclusively for searching and returning extended search results from documents indexed and/or contained in the extended backend 118. In some embodiments, the extended balancers 124 have an additional difference, compared to the standard balancers 112, for improving the efficiency of extended searches. This is explained in more detail below.

Figure 2A:
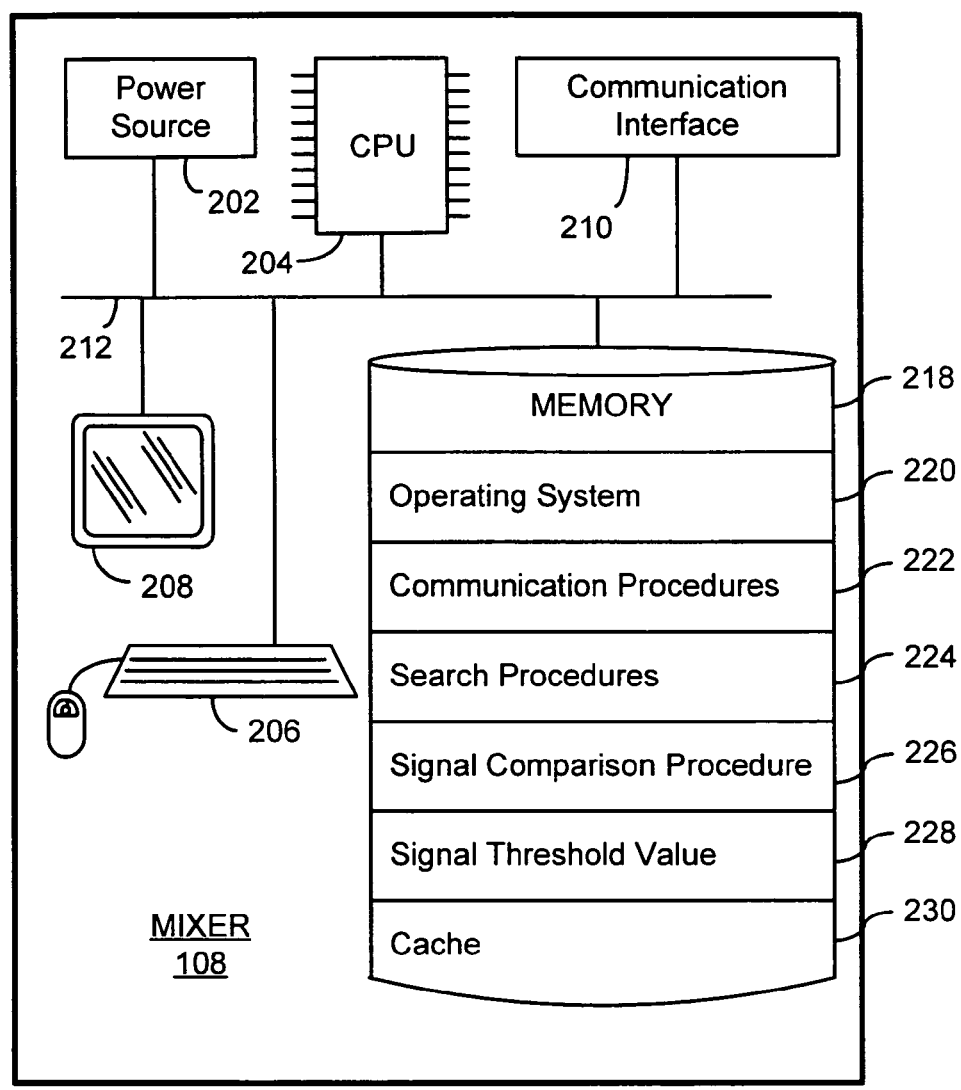
FIG. 2A is a block diagram of one of the mixers shown in FIG. 1.

FIG. 2A is a block diagram of one of the mixers 108 shown in FIG. 1. The mixer 108 preferably includes: at least one data processor or central processing unit (CPU) 204; a memory 218; a communication interface 210 for communicating with the query server 102 (FIG. 1), cache 110 (FIG. 1), standard balancers 112 (FIG. 1), standard document servers 114 (FIG. 1), and extended mixer 120 (FIG. 1); a power source 202 configured to be coupled to a source of power; and at least one bus 212 that interconnects these components. The mixer 108 may also optionally include one or more user interface devices, such as a monitor 208, and a keyboard/mouse 206.

The memory 218 preferably includes high-speed random access memory and may include non-volatile memory, such as one or more magnetic disk storage devices. The memory 218 preferably stores an operating system 220, such as LNUX, UNIX or WINDOWS, that includes procedures for handling basic system services and for performing hardware dependent tasks. The memory 218 also preferably stores communication procedures 222 used for communicating with the query server 102 (FIG. 1), cache 110 (FIG. 1), standard balancers 112 (FIG. 1), standard document servers 114 (FIG. 1), and extended mixer 120 (FIG. 1). In particular, the communication procedures 222 are used for receiving search requests from the query server 102 (FIG. 1); transmitting the requests to the cache 110 (FIG. 1) and the standard balancers 112 (FIG. 1); receiving lists of search results from the cache 110 or the standard balancers 112 (FIG. 1); transmitting requests for snippets of documents identified in the search results to the appropriate standard document servers 114 (FIG. 1); and returning the search results (or a portion of the search results), including a list of located documents and snippets, back to the query server 102 (FIG. 1) for onward transmittal to the computer or device from which the search request was received, as described below in relation to FIGS. 3A–3D and 4. A portion of the search results may be returned to the query server 102, instead of the entire search results, because the search results may include more results (e.g., hundreds of identified documents) than can be conveniently returned to the requester. Since the full search results are stored in the cache 110, the cached results can be used if the requester submits a request for an additional portion of the search results. In some embodiments, the "full search results" are limited to a predefined maximum number M (e.g., 1000 or 1500) of search results, and when a search generates a larger number of search results, document identifiers for the M highest ranked (i.e., having the highest query scores) results are stored in the corresponding cache entry.

The memory 218 also preferably includes: search procedures 224 for performing searches of the standard index servers 116 (FIG. 1); a signal comparison procedures 226 for determining whether predefined criteria, such as a signal threshold value 228, has been met; and a cache 230 for temporarily storing data.

As indicated above, the extended mixer 120 is the same as the mixer 108 in most respects. One of the main differences is that the mixer 108 is configured to send requests to and receive results from the extended mixer 120, while the extended mixer is configured to receive search queries from any of a plurality of mixers 108 and to return search results to those mixers 108. In most other respects, the two mixers 108, 120 are the same, except the mixers may have a number of different configuration parameters, or the like.

Figure 2B:
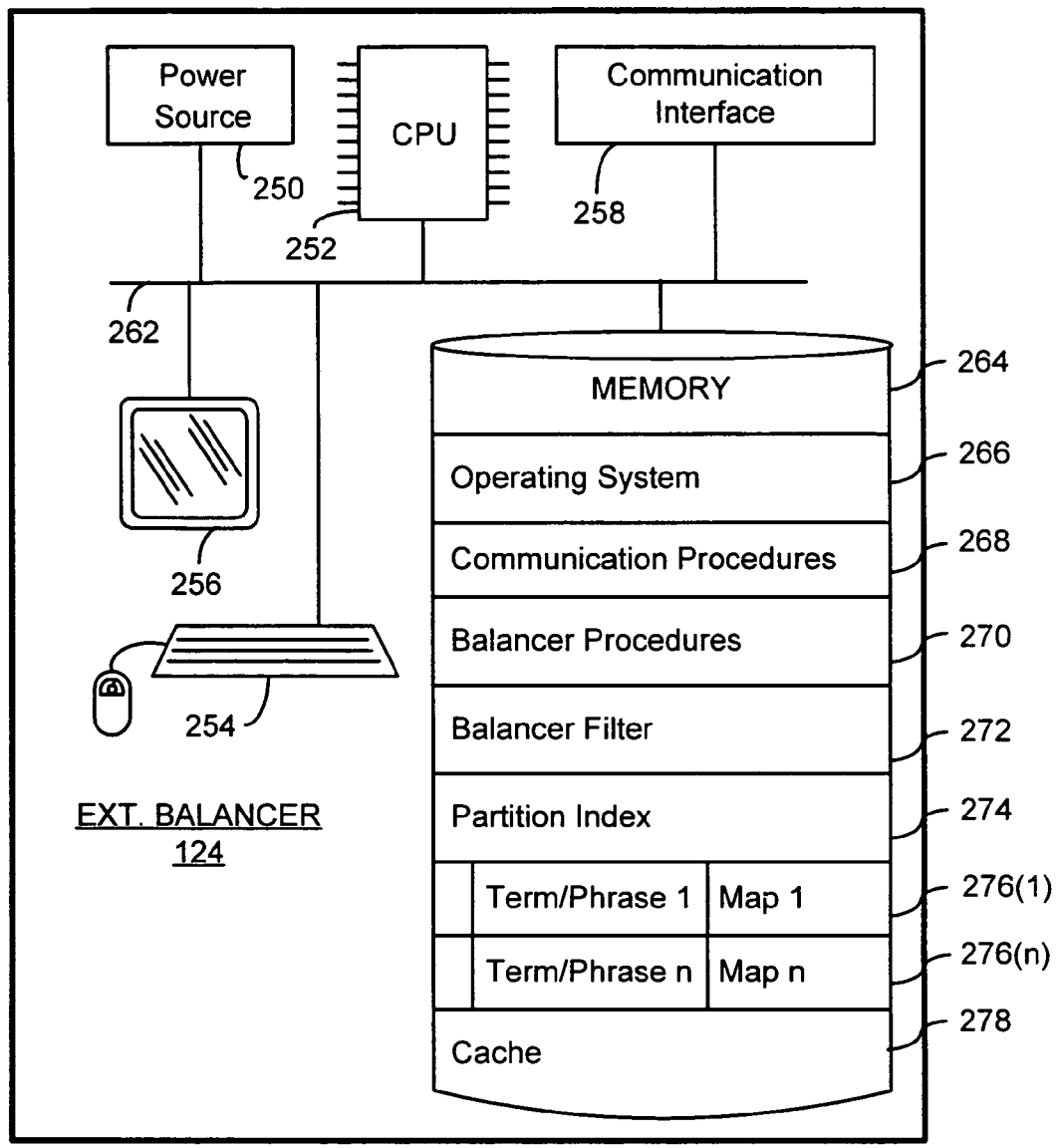
FIG. 2B is a block diagram of one of the extended balancers shown in FIG. 2A.

FIG. 2B is a block diagram of one of the extended balancers 124 shown in FIG. 1. The extended balancer 124 preferably includes: at least one data processor or central processing unit (CPU) 252; a memory 264; a communication interface 258 for communicating with the extended index servers 128 (FIG. 1) and extended mixer 120 (FIG. 1); a power source 250 configured to be coupled to a source of power; and at least one bus 262 that interconnects these components. Each extended balancer 124 may also optionally include one or more user interface devices, such as a monitor 256, and a keyboard/mouse 254.

The memory 264 preferably includes high-speed random access memory and may include non-volatile memory, such as one or more magnetic disk storage devices. The memory 264 preferably stores an operating system 266, such as LINUX, UNIX or WINDOWS, that includes procedures for handling basic system services and for performing hardware dependent tasks. The memory 264 also preferably stores communication procedures 268 used for communicating with the extended index servers 128 (FIG. 1) and extended mixer 120 (FIG. 1). In particular, the communication procedures 268 are used for receiving search requests from the extended mixer 120 (FIG. 1); transmitting the request to the extended index servers 128 (FIG. 1); receiving lists of search results from the extended index servers 128 (FIG. 1); and returning the extended search results, including a list of located documents, back to the mixer 108 (FIG. 1) for onward transmittal to the query server 102, as described below in relation to FIGS. 3 and 4.

The memory 264 also preferably includes balancer procedures 270 for coordinating the transmission of search requests to the extended index servers 128 (FIG. 1), receiving multiple extended search results from the multiple extended index servers 128 (FIG. 1), removing duplicate search results, and transmitting a single list of search results back to the mixer 108 (FIG. 1). The memory 264 preferably further includes a balancer filter 272 that utilizes a partition index 274, as described below with reference to FIGS. 3A 3D and 4; and a cache 230 for temporarily storing data.

In some embodiments, the extended index servers 128 of the extended backend 118 store an extended index that has been partitioned into many extended index partitions 119 and sub-partitions. For instance, in one embodiment the number of extended index sub-partitions is between 1000 and 10,000, which each extended index sub-partition containing an index of the terms found in, for example, a half million documents. In some embodiments, solely for purposes of the partition index 274, the extended index sub-partitions are sub-partitioned into a number of sub—sub-partitions. In some embodiments, the number of sub—sub-partitions for each extended index sub-partition is between 16 and 4096.

The partition index 274 (for a particular extended balancer 124) is similar to a document index partition, except that its purpose is to indicate which sub-partitions of the extended index contain documents having specified terms. For each term in the partition index 274, the partition index 274 maps that term to a map 276. The map 276 for any particular term indicates the sub-partitions of the extended index which have at least one document containing the term. In some embodiments, the map 276 contains a bit for each sub-partition of the extended index partition 119 serviced by the extended balancer 124, with a first value of the bit indicating that the term is found in at least one document in the corresponding sub-partition of the extended index, and a second value of the bit indicating that the term is not found in any document in the corresponding sub-partition of the extended index. The balancer filter 272 and partition index 274 are used to increase the efficiency of the extended search of the extended backend 118 (FIG. 1) by reducing the number of extended index servers 128 that are used to service many search queries.

In one embodiment, the maps 276 are encoded in one of three ways, depending on the number of sub-partitions (or sub—sub-partitions, as explained below) that contain a document having the term corresponding to the map. In particular, the three encodings are a delta-encoded inclusion list, which is a list of items (e.g., sub-partitions or sub—sub-partitions) to which the term is mapped; a delta-encoded exclusion list of items, which is a list of items to which the term is not mapped, thereby indicating that the item is mapped to all the other items; and a bit map, having one bit for each item. The map 276 for a term is encoded as an delta-encoded inclusion list when the number of items (e.g., sub-partitions or sub—sub-partitions) to which the term is mapped is less than a first predefined threshold. The map 276 for a term is encoded as an delta-encoded exclusion list when the term is mapped to all the available items except a number that is less than a second predefined threshold, which may be the same or different from the first predefined threshold. Finally, the map 276 for a term is encoded as a bit map, with one bit for each item, when the number of items (e.g., sub-partitions or sub—sub-partitions) to which the term is mapped is more than the first predefined threshold and is less than the entire set of items minus the second predefined threshold. Furthermore, each map 276 includes a value indicating which type of encoding has been used to represent the set of sub-partitions or sub—sub-partitions to which the term is mapped. It is noted that delta-encoded lists are well known to computer scientists. The particular delta-encoding used in any particular implementation will be an encoding that is determined to be space efficient.

In some embodiments the standard balancers 112 are similar to the extended balancers 124 described above, except that the standard balancers 112 do not have a balancer filter 272 and partition index 274.

Figure 2C:
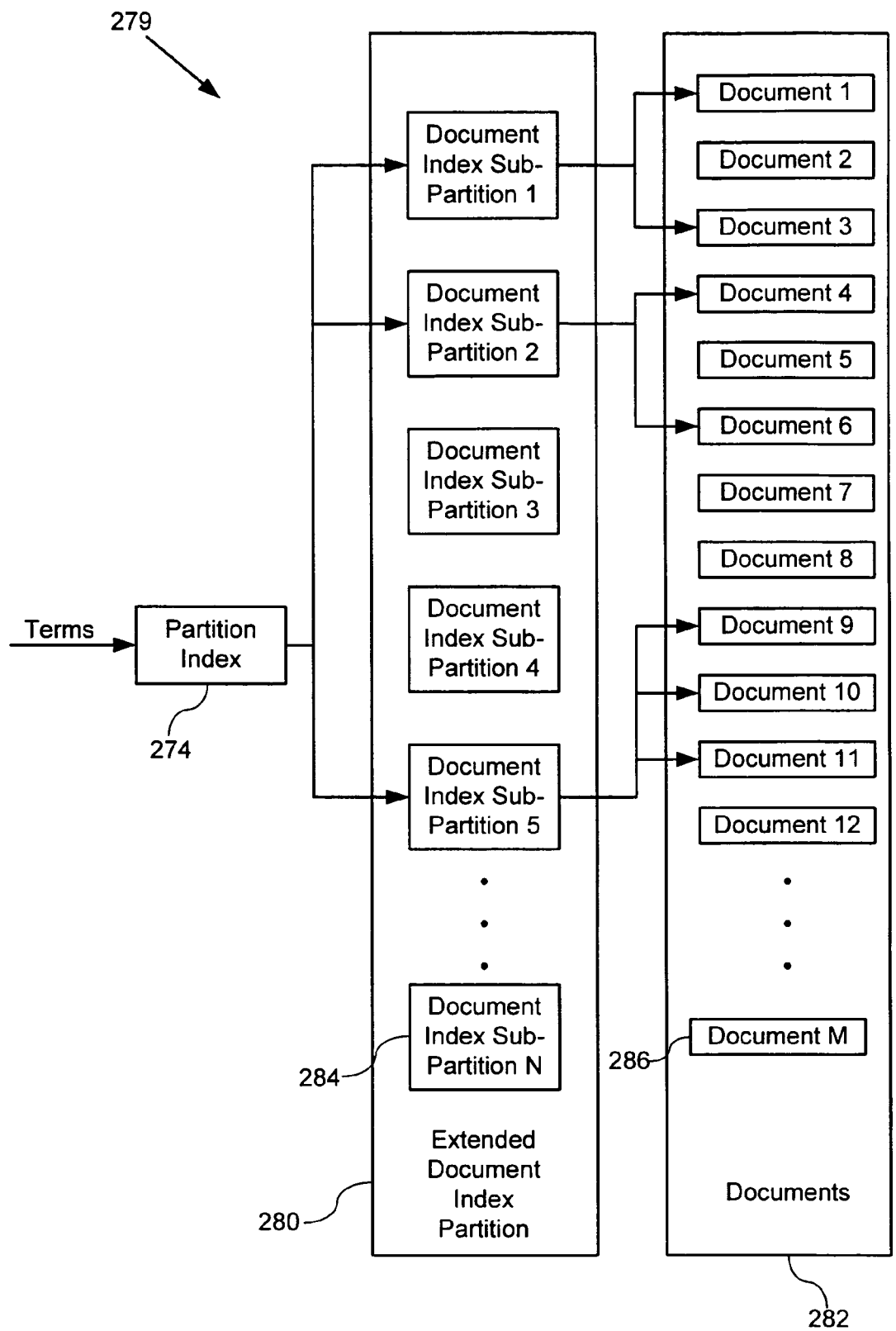
FIG. 2C is a schematic diagram of a system for more efficiently searching the extended index server.

FIG. 2C is a schematic diagram of a system 279 for more efficiently searching the extended index server. The system 279 includes a partition index 274, a document index 280, and documents 282. In a preferred embodiment, the partition index 274 is contained within the extended balancer 124 (FIG. 1), the extended document index partition 280 is contained within a set of extended index servers 128 (FIG. 1), and the documents 282 are contained within one or more extended documents servers 126 (FIG. 1). It should, however, be appreciated that a similar system may be employed elsewhere to more efficiently search a large index of documents. For example, the partition index 274 may be contained within the standard balancer 112 (FIG. 1), the document index partition 280 may be contained within a set of standard index servers 116 (FIG. 1), and the documents 282 may be contained within a set of standard documents servers 114 (FIG. 1).

The documents 282 include multiple individual documents 286, such as web-pages, each containing multiple terms. The extended document index partition 280 preferably includes a plurality of document index sub-partitions 284, each including a subset of the document index partition 280. Each document index sub-partition 284 maps any specified term to a set of documents 286 containing that term. In other words, each document index sub-partition contains information associating documents with the terms in those documents. For example, document index sub-partition 1 may map the term "IEEE" to documents 1 and 3 in which the term "IEEE" is located.

The partition index 274 in turn maps any specified term to a subset of the document index sub-partitions. In other words, the partition index 274 contains information associating the document index sub-partitions with the terms found in the documents indexed by those sub-partitions. Stated differently, the partition index 274 maps term(s) to document index sub-partition(s) 284 that in turn map the term(s) to document(s) 286 containing the term(s).

From the perspective a single extended balancer 124, the associated extended partition 119 contains a document index, which is called an extended document index partition elsewhere in this document. The extended index sub-partitions discussed above are partitions of the document index contained and handled by the extended balancer 124 and its extended index servers 148. The partition index 274, from the perspective of a single extended balancer 124, maps terms to partitions of the document index serviced by the extended balancer. In other words, one level of the document index hierarchy is removed when one focuses on the operation of the extended balancer, because the document indexes handled by the other extended balancers are not considered.

In use, the extended balancer 124 (FIG. 1) receives a search query containing one or more terms. The balancer procedures 270 (FIG. 2B) and the balancer filter 272 (FIG. 2B) then search the partition index 274 (FIG. 2B) to identify only those document index sub-partitions 284 that index the documents 282 in which the term(s) can be found. The search query is then transmitted to only those document index sub-partitions 284 that index the one or more terms. The document index sub-partitions are then searched to generate search results containing a list of the documents 286 in which the term(s) can be found. Further details of the method for more efficiently searching an extended database of documents can be found below in relation to FIG. 3C.

FIGS. 3A–3D are a flow chart of a method 300 for performing an extended search, according to an embodiment of the invention. Initially, a user submits a search query to the system 100 (FIG. 1). The search query is received at a particular datacenter 104 (FIG. 1) (based on DNS data) and the search request is transmitted to one of the several query servers in that datacenter based on a load balancing algorithm. The query server 102 (FIG. 1) receives the search request at step 302 and transmits the search query to one of the mixers 108 (FIG. 1) also based on a load balancing algorithm. The mixer receives the search query and, thereafter, transmits the search query to the cache 110 (FIG. 1), at step 304, in order to search the cache for search results. In a preferred embodiment, before transmitting the search request to the cache, the mixer first normalizes and hashes the search request.

A hash value representing the search request is received by the cache at step 306. The cache is then searched at step 308, and if an entry corresponding to the hash value is found, the results of the search are transmitted back to the mixer at step 310. It should be appreciated that the results may contain a list of located documents, with or without snippets, or an indication that no results were located in the cache. The search results are received by the mixer at step 312, which then determines, at step 314, whether search results were located. Alternatively, search results without snippets are returned to the mixer or query server, which in turn requests snippets from the cache. The request for snippets may occur once or more than once. If the requested snippets are not stored in the cache, the mixer requests the snippets from the standard document servers (114, FIG. 1). These snippets are then returned to the mixer or query server.

If no search results were located (314—No), then the search request is transmitted to the standard index server(s) 116 (FIG. 1) at step 316. In a preferred embodiment, the search request is actually first transmitted to multiple standard balancers 112 (FIG. 1) (one within each partition 106) that transmit the search onward to the standard index server(s). Each balancer 112 (FIG. 1) transmits the search request to a set of standard index servers 116 (FIG. 1). Each standard index server 116 (FIG. 1) stores and searches one or more partitions of the standard index to produce a set of search results. In some embodiments, each balancer 112 (FIG. 1) sends the search query to between ten and one hundred standard index servers 116 (FIG. 1), and each standard index server 116 (FIG. 1) is configured to store and search multiple (e.g., two to ten) index sub-partitions.

The search request is received by the standard index server(s) 116 (FIG. 1) at step 318. The standard index server(s) are then searched at step 320 and the results of the search transmitted back to the mixer at step 322. It should be appreciated that the results may contain a list of located documents, or an indication that no results were located in the standard index server(s). The search results are received by the mixer at step 324, which then determines, at step 326 (FIG. 3B), whether search results were located.

If search results were not located (326—No), then the user may be notified that no results were obtained (not shown). If search results were located (326—Yes), then, based on the search results, a snippet request is transmitted to the standard document server(s) 114 (FIG. 1), at step 328. It should, however, be appreciated that the search results may be transmitted to the query server, which in turn requests the snippets. In a preferred embodiment, the request for snippets contains a request for a snippet of text surrounding the searched term in each document located in the search results. In some embodiments, when the number of documents identified by the search results is below a threshold value snippets are generated for only a subset of the documents (e.g., the N highest ranked documents, where N is typically a number between ten and thirty) located in the search results. The request for snippets is received by the standard document servers 114 (FIG. 1) at step 330, which generate the requested snippets at step 332 from documents identified in the search results. The standard document servers transmit the snippets back to the mixer 108 (FIG. 1) at step 334. The snippets are received by the mixer at step 336. The mixer then transmits the search results and snippets to the cache, at step 338. The cache saves the search results and snippets in memory at step 340.

Either after search results are located in the cache (314—Yes), or once a reply is received from the standard index server(s) at step 324 (FIG. 3A), the signal comparison procedures 226 (FIG. 2A) in the mixer 108 (FIG. 1) determine whether a signal has met the predetermined signal threshold value 228 (FIG. 2A) at step 342. The signal is based on the reply received from searching the cache, or the reply received from searching the standard index server(s). For example, the signal may indicate that less than ten search results were obtained when searching the cache or standard index server(s). If ten results is the signal threshold value 228 (FIG. 1), and the number of search results for a particular search query is less than ten, then the signal comparison procedures 226 (FIG. 2A) will determine that the signal threshold value has not been met (342—No) and will then perform an extended search.

The number of search results from the standard index may be obtained in a number of ways. For example, the standard index server or some portion thereof may return search results, inherently representing the number of results; the number of results may be obtained on-the-fly, i.e., while the search of the standard index servers is being performed, the system keeps track of how frequently it is obtaining results and extrapolates this to obtain a search results number; any other estimation technique; or the like. For example, an estimate may be generated using a sample index that is significantly smaller than the full index (e.g., less than ten percent of the size of the full index, and in some embodiments less than two percent of the size of the full index).

Other suitable signals, besides receiving too few results, include: determining whether the amortized cost of performing the extended search is small, i.e., performing a cost to quality of search results comparison; determining if the user is not satisfied with the standard results returned from searching the standard index server(s), for example where a user selects a "next set of results" button repetitively; where the query scores of the results are low (i.e., fall below a threshold value, on average); if the load on the extended index servers is low; if for a given query the cost is low (different queries have different costs) or any combination of these signals.

If it is determined that the signal threshold value has been met (342—Yes), then the search results (or a portion of the search results when the number of search results exceeds a limit value) stored in the cache 110 (FIG. 1) are transmitted to the query server 102 (FIG. 1) from the mixer 108 (FIG. 1), at step 344. These results, preferably containing a list of located documents and snippets, are received by the query server, which then forwards the search results to the user that submitted the search query at step 346.

If, however, the signal threshold value has not been met (342—No), then the search request is transmitted to the extended mixer 120 (FIG. 1) at step 348. The extended mixer receives the search request and transmits it to the extended cache 122 (FIG. 1) at step 350. The extended cache receives the search request, at step 352, and is then searched at step 354 and the results of the search transmitted back to the extended mixer at step 356. It should be appreciated that the results may contain a list of located documents, with or without snippets, or an indication that no results were located in the cache. The search results are received by the extended mixer at step 358, which then determines, at step 360, whether extended search results were located. Alternatively, search results without snippets are returned to the mixer or query server, which in turn requests snippets from the cache. The request for snippets may occur once or more than once. These snippets are then returned to the mixer or query server.

If extended search results were located (360—Yes), then the extended search results, preferably together with the associated snippets, are transmitted to the mixer 108 (FIG. 1) from the extended mixer 120 (FIG. 1) at step 362. The mixer receives the extended search results (and snippets), at step 364, and aggregates the extended search results from searching the extended cache 122 (FIG. 1) with the standard search results obtained from searching the cache 110 (FIG. 1) or standard index server 116 (FIG. 1) into aggregated search results, at step 366. However, it should be appreciated that there may not be any standard search results (if the standard search finds no documents that satisfy the search query), in which case the aggregation performed at step 366 will only include the extended search results. These aggregated search results are then transmitted to the query server 102 (FIG. 1) at step 368. The query server receives the aggregated search results and transmits them on to the computer, device or user from which the search query was received at step 370. It should, however, be appreciated that the search results may be transmitted back to the query server, which in turn requests the snippets.

If no extended search results were located in the extended cache (360—No), then the search request is transmitted to the extended index servers 128 (FIG. 1) at step 372. In a preferred embodiment, the search request is actually first transmitted to multiple extended balancers 124 (FIG. 1) that transmit the search onward to the extended index servers 128. However, as will be described below, a filtering operation is performed in some embodiments, which may reduce the number of extended index servers to which the search query is sent.

The search request is received by the extended index servers 128 (FIG. 1) at step 376. The extended index servers are then searched at step 378 and the results of the search transmitted back to the extended mixer at step 380. It should be appreciated that the results may contain a list of located documents, or an indication that no results were located in the extended index server(s).

In a preferred embodiment, the search 378 is preferably performed as follows. The balancer procedures 270 (FIG. 2B) in the extended balancer 124 (FIG. 1) using the balancer filter 272 (FIG. 2B) performs a lookup operation for each term in the received search query to locate corresponding information in the partition index 274 (FIG. 2B). The balancer filter 272 uses the information in the partition index 274 to produces a sub-partition map for each of the terms in the search query. At step 375, a map of the extended document index sub-partitions is produced for each term of the search query. When the map is encoded as a bit map, the map contains a bit for each sub-partition of the extended index partition serviced by the extended balancer, with a first value of the bit indicating that the term is found in at least one document in the corresponding sub-partition of the extended index, and a second value of the bit indicating that the term is not found in any document in the corresponding sub-partition of the extended index. In other embodiments, the map may be represented as a list of sub-partitions to which a term is mapped. The map for a term can conservatively include document index sub-partitions that do not actually have the term if need be.

These maps are then combined into a combined map using Boolean logic, at step 377, such as by ANDing the various maps together for each term. More specifically, the maps are logically combined in accordance with the Boolean logic of the search query. Thus, if the search query contains Boolean AND, OR, and NOT operators, or any subset thereof, the corresponding Boolean operations are performed on the maps corresponding to the terms in the search query. The combined map indicates which document index sub-partitions may index one or more documents that satisfy the search query, and which document index sub-partitions do not index any documents that satisfy the search query.

The search query is then sent to only those extended document index sub-partitions indicated by the combined map as potentially indexing documents that satisfy the search query. In some embodiments, each of the extended index servers 128 coupled to an extended balancer corresponds to a distinct subset of the combined map produced by the balancer filter. If the subset for a particular extended index server is not empty (i.e., indicates that at least one sub-partition), the search query is sent to that extended index server. In some embodiments, the extended index server then searches (at step 379) all the sub-partitions serviced by that extended search indexer for the terms in the search query. In other embodiments, the portion of the combined map corresponding to the extended index server is sent to that extended index server along with the search query, and the extended index server only searches those sub-partitions indicated by the combined map as potentially indexing documents that satisfy the search query.

This filtering of the extended search to only those sub-partitions containing the searched terms significantly reduces, on average, the number of extended document index sub-partitions called upon to participate in each extended search. As an indirect result, the number of search requests received by each extended index server is significantly reduced, which improves the efficiency with which extended searches are performed and reduces the average latency of those extended searches.

When the maps produced by the partition index are based on sub—sub-partitions of an extended document index partition, instead of sub-partitions, the filtering performed by the extended balancer is significantly improved because fewer documents are included in the sub—sub-partitions. For example, consider a system in which each extended document index sub-partition indexes the terms in approximately a half million documents, and the extended document index sub-partitions are each partitioned into 128 sub—sub-partitions (thereby increasing the size of the maps in the partition index by a factor of 128, unless a space saving encoding methodology is used). Each sub—sub-partition will therefore index about 4,000 documents. When a search query includes at least one term that is found in a small number (e.g., less than 100) of documents within the extended document index, the odds that the combined map produced by the extended balancer filter will have "false positives" (falsely indicating that a particular sub-partition or sub—sub-partition may contain at least one document satisfying the search query) is much lower when the extended balancer filter is based on extended index sub—sub-partitions than when it is based on extended index sub-partitions.

When the maps produced by the partition index are based on sub—sub-partitions of an extended document index partition, instead of sub-partitions, the balancer may provide to the extended index servers either a binary result (yes/no) for each sub-partition, or a detailed result map for each sub-partition, indicating which sub—sub-partitions potentially include documents that satisfy the search query and which do not. In some embodiments, the extended index servers are configured to use the detailed result map so as to search (at step 379) only in the portions of each sub-partition index that correspond to the bits or items in the detailed result map that indicate sub—sub-partitions that potentially include documents that satisfy the search query. In other embodiments, the extended indexer servers are configured to use only a binary result for each sub-partition when determining which portions of the partition index to search.

The search results are received by the extended mixer at step 374, which then determines, at step 382 (FIG. 3D), whether search results were located. If extended search results were located (382—Yes), then, based on the extended search results, a snippet request is transmitted to the extended document server(s) 126 (FIG. 1), at step 384. In a preferred embodiment, the request for snippets contains a request for a snippet of text surrounding the searched term in each document located in the extended search results. The request for snippets is received by the extended document servers at step 386, which generate the requested snippets at step 388 from documents identified in the extended search results, and transmits the snippets back to the extended mixer 120 (FIG. 1) at step 390. The snippets are received by the extended mixer at step 392. The extended mixer then transmits the extended search results and snippets to both the extended cache and the mixer at step 394. The extended cache 122 receives the extended search results and snippets and saves them in memory (which may include high speed memory as well as disk storage) at step 395. If no extended search results are located (382), the extended mixer returns that information to the standard mixer (396, 397).

The mixer receives the extended search results (and snippets), if any, at step 396, and aggregates the extended search results from searching the extended index server 128 (FIG. 1) with the standard search results obtained from searching the cache 110 (FIG. 1) or standard index server 116 (FIG. 1) into aggregated search results, at step 397. However, it should be appreciate that there may not be any standard search results, in which case the aggregation performed at step 397 will only include the extended search results. If there are no extended search results, only the standard search results (if any) are included in the aggregated search results. These aggregated search results are then transmitted to the query server 102 (FIG. 1) at step 398. The query server receives the aggregated search results and transmits them toward the user at step 399.

Figure 3A:
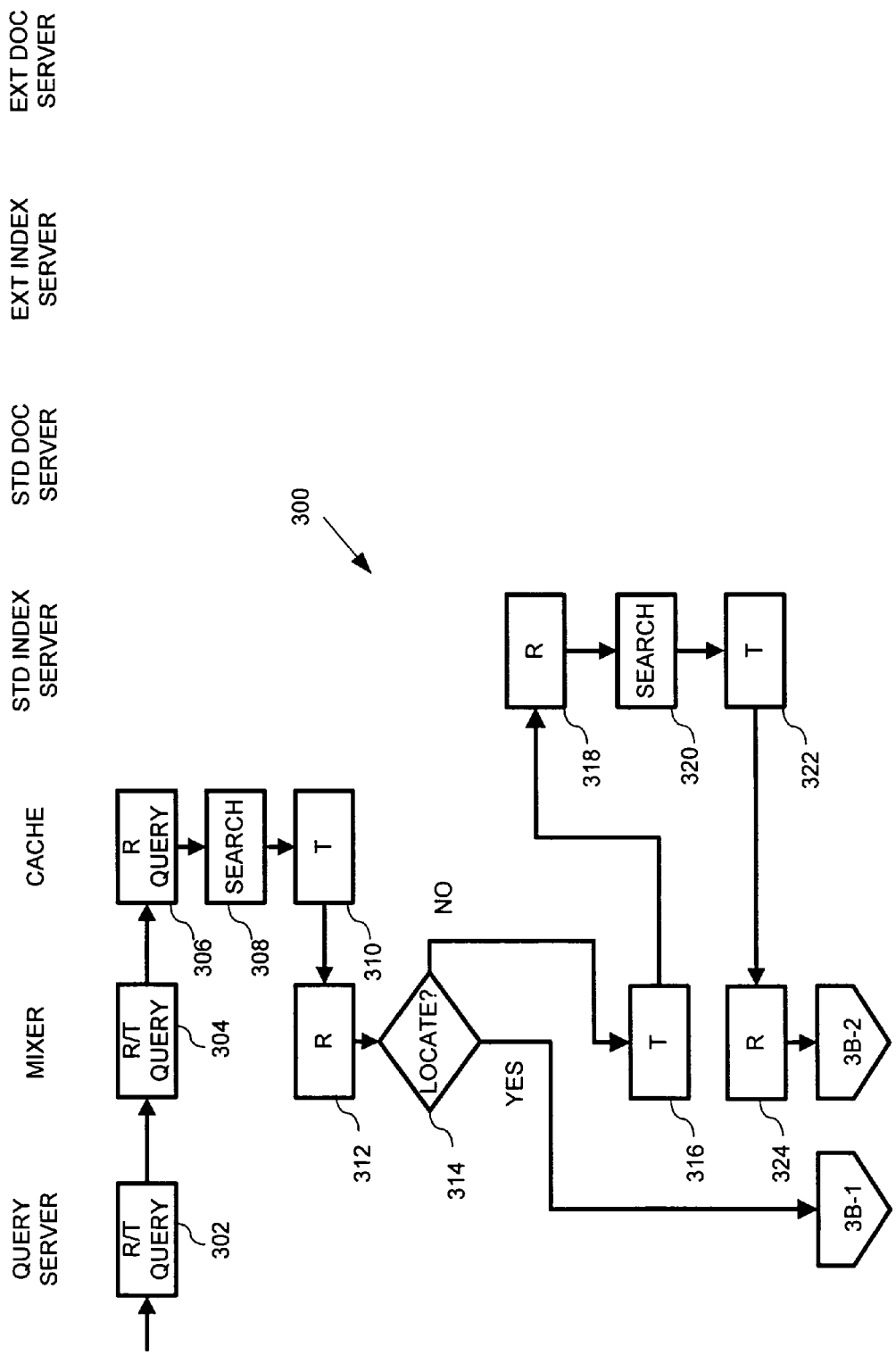
FIGS. 3A–3D are a flow chart of a method for performing an extended search.
Figure 3B:
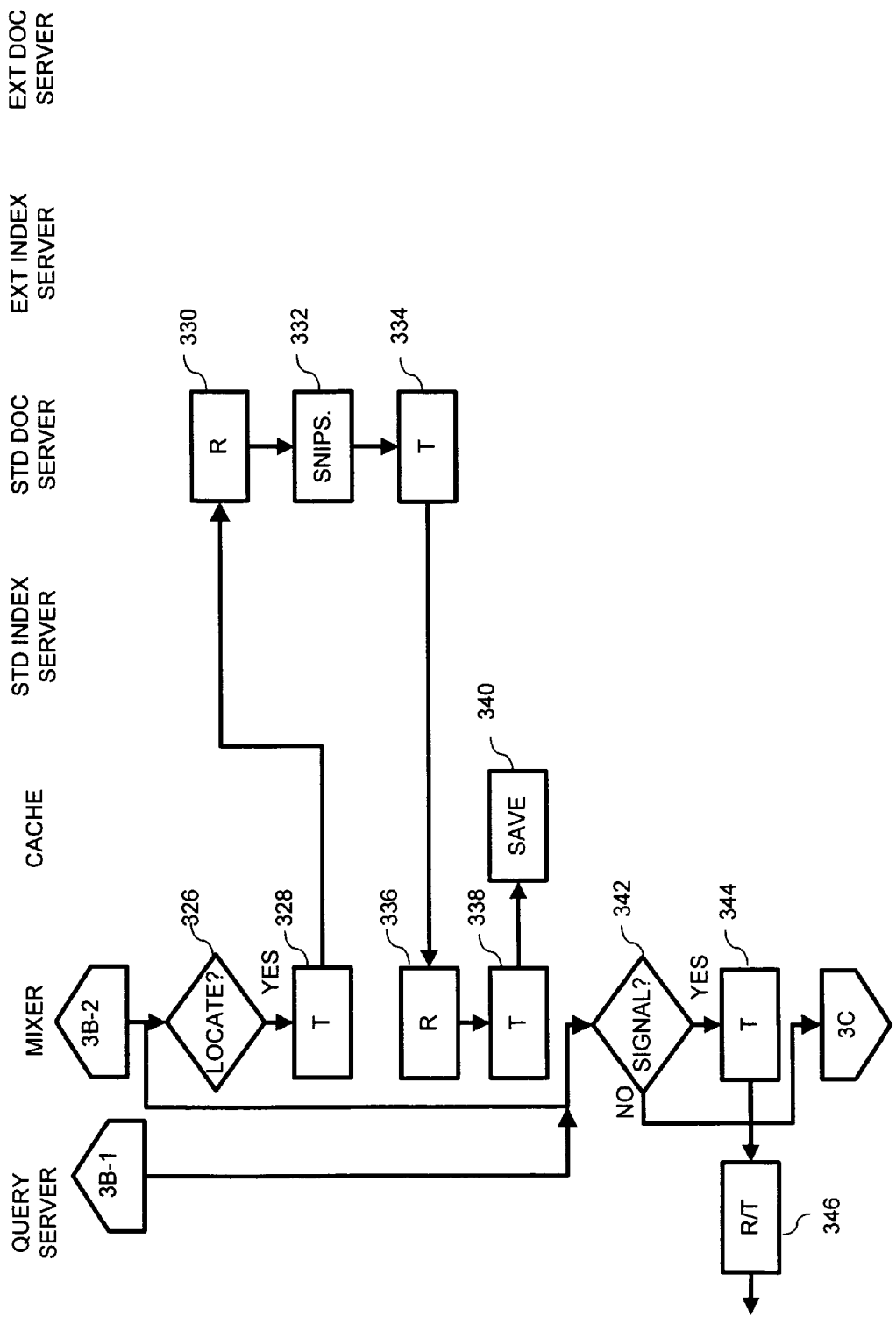
Figure 3C:
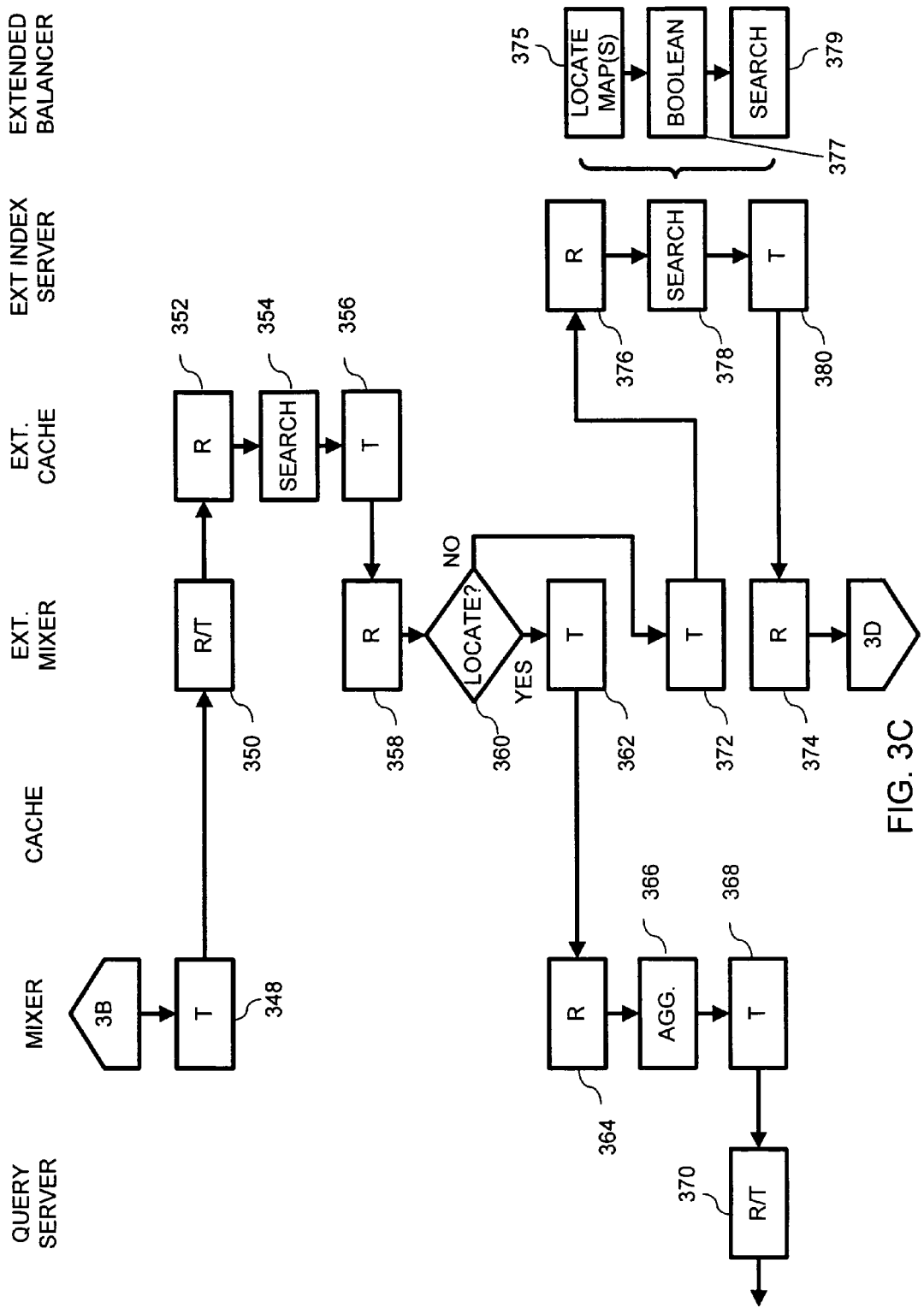
Figure 3D:
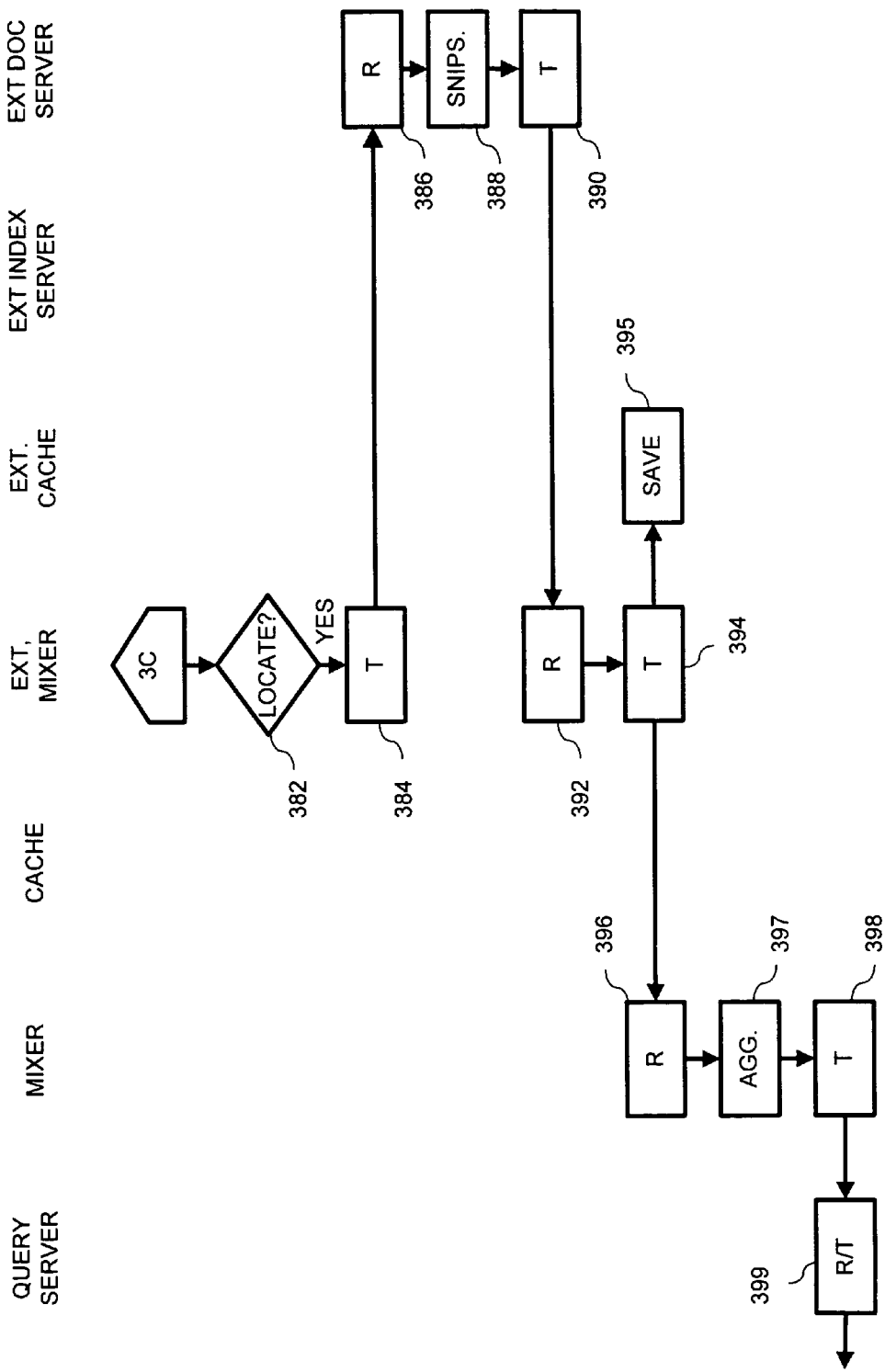
Figure 4:
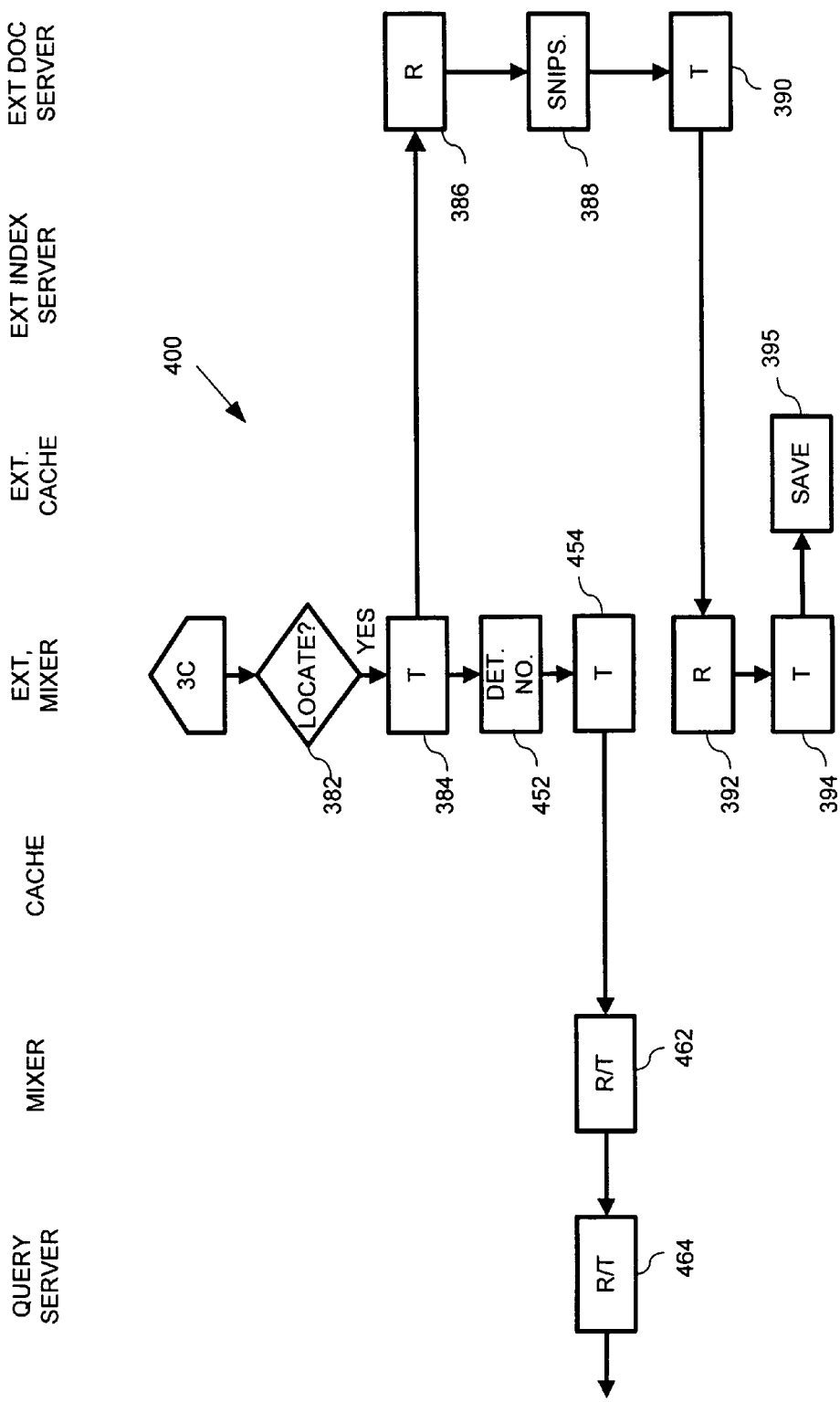
FIG. 4 is a flow chart of another method for performing an extended search.

FIG. 4 is a flow chart of an alternative method 400 for performing an extended search. FIG. 4 continues from FIG. 3C. Steps 382 to 395 are the same as those described above in relation to FIG. 3C. However, at the same time as or after transmitting a request for snippets to the extended document servers at step 384, the extended mixer determines how many documents were located in the extended search results at step 452. This extended results number is then sent to the mixer at step 454. It should be noted that the mixer has already received with any standard search results obtained (and the standard snippets). The mixer receives the extended results number and transmits this information along with the standard search results (and standard snippets) to the query server at step 462. Similarly, the query server receives the extended results number and the standard search results (and standard snippets) and transmits (at step 464) these towards the computer, device, or user who submitted the search query to the search engine. Ultimately, the standard search results and snippets are presented to the user together with a link stating that the number of extended results can be viewed by selecting the link. For example, a link stating "click here to view 20 more results" may be presented to the user. Alternatively, a link to an extended search may also be provided without providing the number of extended search results, or before the extended search results have been obtained. If the user selects the link, the search is repeated from step 302 (FIG. 3A), although now the extended search results will be presented to the user as they have been stored in the extended cache at step 395. In this way, if a search query locates unsatisfactory results by searching standard index server(s), then extended index server(s) are automatically searched, thereby providing the user with as many useful results as possible from not only the usual or common documents, but also from the more uncommon or obscure documents as well.

The foregoing descriptions of specific embodiments of the present invention are presented for purposes of illustration and description. For example, any methods described herein are merely examples intended to illustrate one way of performing the invention. Furthermore, the order of steps in the method is not necessarily intended to occur in the sequence laid out. Also, the components of the system 100 (FIG. 1) are merely examples intended to illustrate one system of the invention. The described methods or components are not intended to be exhaustive or to limit the invention to the precise forms disclosed. Obviously many modifications and variations are possible in view of the above teachings. For example, all, or a subset of all, search results from both the standard search index and the extended search index can be stored in the cache 110 (FIG. 1). Also, the components of the system may be arranged in a different manner to that shown and described.

Furthermore, if feasible, any single component described herein may be replaced with more than one of the same component, or multiple components may be incorporated into a single component. The embodiments were chosen and described in order to best explain the principles of the invention and its practical applications, to thereby enable others skilled in the art to best utilize the invention and various embodiments with various modifications as are suited to the particular use contemplated.

Still further, although balancing using the balancer filter 272 (FIG. 2B) and partition index 274 (FIG. 2B) are described with reference to the extended balancer 124 (FIG. 1) in the description of FIG. 2B and FIG. 3C, it should be appreciated that that such balancing may also occur at any other balancer, such as the standard balancer(s) 112 (FIG. 1). For example, the standard balancer(s) 112 (FIG. 1) may also include a balancer filter and partition index for directing a search query to only those standard index servers that potentially index documents satisfying the search query. Also, balancers may preferably be coupled between the mixer 108 (FIG. 1) and the standard document servers 114 (FIG. 1), as well as between the extended mixer 120 (FIG. 1) and the extended document servers 126 (FIG. 1). Furthermore, the extended index server(s) may form part of the standard index server(s), but will not be searched if a signal is not provided.

Further, although the above described system and method is primarily described for searching the Internet, it may apply equally as well to searching any other collection of documents, such as books, catalogues, news, etc. In addition, it should be appreciated that the size of the standard index and the extended index may be the same, or they may differ. For example, the extended index may be significantly larger. Also, there may be multiple standard backends per datacenter. It is intended that the scope of the invention be defined by the following claims and their equivalents.

What we claim is:

1. An extended search method comprising:
   receiving a search query;
   searching a standard index of a set of replicated standard indexes having multiple instances of the standard index, based on said search query;
   detecting a signal based on said searching of said standard index; and
   when the signal meets predefined criteria:
      searching an extended index of a set of extended indexes having at least one instance of the extended index, wherein the set of extended indexes are fewer in number than the set of standard indexes; and
      wherein the standard index and extended index are searched to identify documents that contain terms specified by the search query;
   obtaining extended search results from the extended index; and
   transmitting at least a portion of the extended search results.

2. The extended search method of claim 1, wherein said detecting comprises determining whether said searching of said standard index is estimated to produce less than a predetermined number of standard search results.

3. The extended search method of claim 1, wherein said detecting comprises determining whether said searching of said extended index is estimated to add a cost to performing said search query that is less than a predefined cost threshold.

4. The extended search method of claim 1, wherein said detecting comprises determining that an amortized cost of searching the extended index is less than a predefined cost threshold.

5. The extended search method of claim 1, wherein said detecting comprises determining that the user is not satisfied with standard search results returned from searching the standard index.

6. The extended search method of claim 1, wherein said detecting comprises determining that a load on the extended index is less than a predefined load threshold.

7. The extended search method of claim 1, wherein said detecting comprises receiving a request for extended search results.

8. The extended search method of claim 1, further comprising, before said searching of said extended index, receiving standard search results from said standard index.

9. The extended search method of claim 8, wherein said detecting comprises determining that a query score of each of said standard search results is below a predetermined limit.

10. The extended search method of claim 8, further comprising, prior to said transmitting, aggregating at least a portion of said standard search results and at least a portion of said extended search results into aggregated search results.

11. The extended search method of claim 10, wherein said transmitting comprises transmitting said aggregated search results.

12. The extended search method of claim 1, wherein said searching of said standard index comprises searching a cache of stored search results.

13. The extended search method of claim 12, wherein said searching of said standard index further comprises searching a standard index server when results of said search query are not stored in said cache.

14. The extended search method of claim 1, wherein said searching of said extended index comprises searching an extended cache of stored extended search results.

15. The extended search method of claim 14, wherein said searching of said extended index further comprises searching an extended index server when results of said search query are not stored in said extended cache.

16. The extended search method of claim 1, wherein said searching of said standard index and said searching of said extended index further comprise generating a list of search results and generating associated snippets of documents identified by at least a subset of said search results.

17. The extended search method of claim 1, further comprising, before said obtaining:
estimating a number of extended search results; and
transmitting said number to a requester of said search query.

18. An extended search method comprising:
receiving search queries at each of a plurality of standard search engines, each having a local instance of a standard index of documents;
at each of the standard search engines, searching the standard index of documents based on a respective received search query,
receiving a signal based on said searching of the standard index, and
when the received signal meets predefined criteria:
searching a shared extended index of documents based on the respective received search query to obtain extended search results from the extended index; and
transmitting at least a portion of the extended search results;
wherein the shared extended index is shared by the plurality of standard search engines.

19. A document search system, comprising:
multiple replicated standard indexes;
one or more extended indexes, wherein the one or more of extended indexes are fewer in number than the set of standard indexes; and wherein the standard indexes and the one or more extended indexes map respective terms to documents that contain the terms;
a mixer, comprising:
a processor;
a communications interface; and
a memory, comprising:
communications procedures for receiving a search query, and for transmitting search results;
a signal threshold value;
signal comparison procedures for comparing a signal obtained from searching a standard index of said standard search indexes with predefined criteria; and
searching procedures for searching at least one of said standard indexes based on said search query, and for searching an extended index of said one or more extended indexes based on said signal, said predefined criteria, and said search query.

20. The document search system of claim 19, wherein said predefined criteria comprise said signal threshold value.

21. The document search system of claim 19, further comprising a query server configured to receive search queries, transmit said search queries to said mixer, receive search results from said mixer, and transmit said search results to requesters of said search queries.

22. The document search system of claim 19, comprising a cache coupled to said mixer, where said cache stores cached search results.

23. The document search system of claim 22, wherein said cache contains snippets of documents represented by at least a subset of said cached search results.

24. The document search system of claim 19, further comprising at least one standard balancer coupled between said mixer and said standard index, where said at least one standard balancer distributes said search queries among partitioned subsets of said standard index.

25. The document search system of claim 19, further comprising at least one standard document server coupled to said mixer, where said at least one standard document server generates snippets for at least a subset of documents identified by each standard search result.

26. The document search system of claim 19, further comprising an extended mixer coupled between said mixer and said extended indexes.

27. The document search system of claim 19, further comprising an extended cache coupled to said extended mixer, where said extended cache stores cached extended search results.

28. The document search system of claim 27, wherein said extended cache stores snippets of at least a subset of documents identified by said cached extended search results.

29. The document search system of claim 19, further comprising at least one extended balancer coupled between said extended mixer and said extended index, where said extended balancer distributes said search queries among partitioned subsets of said extended index.

30. The document search system of claim 19, further comprising at least one extended document server coupled to said extended mixer, where said at least one extended document server generates snippets for at least a subset of documents identified by each extended search result.

31. The document search system of claim 19, wherein said standard indexes are stored on a plurality of standard index servers that are distinct and separate from the mixer.

32. The document search system of claim 19, wherein said one or more extended indexes are stored on a plurality of extended index servers that are distinct and separate from the mixer.

33. A document search system, comprising:
a plurality of standard search engines, each having a local instance of a standard index of documents;
an extended index of documents;
each of the standard search engines including:
search logic configured to search the standard index of documents based on a respective search query, and to detect a signal that is based on said searching of the standard index;
extended logic, activated when the detected signal meets predefined criteria, and configured to search the extended index of documents based on the respective search query to obtain extended search results from the extended index; and
an interface to transmit at least a portion of the extended search results;
wherein the extended index is shared by the plurality of standard search engines.

* * * * *